United States Patent
Sumimoto

[11] Patent Number: 5,872,310
[45] Date of Patent: Feb. 16, 1999

[54] METHOD FOR MAINTAINING CLEAN SURFACES FOR VALVE SEAT FACES OF INTERNAL COMBUSTION ENGINE

[75] Inventor: Morio Sumimoto, Yokohama, Japan

[73] Assignee: Glenn R. Premru, Scottsdale, Ariz.

[21] Appl. No.: 839,774

[22] Filed: Apr. 15, 1997

[30] Foreign Application Priority Data

Dec. 27, 1996 [JP] Japan .................................... 8-356608

[51] Int. Cl.$^6$ .................................................. G01M 15/00
[52] U.S. Cl. ............................................................ 73/53.05
[58] Field of Search ............................ 73/53.05, 61.72, 73/116, 117.2, 118.1, 119 R; 210/321.8, 323.1, 416.5

[56] References Cited

U.S. PATENT DOCUMENTS

| | | | |
|---|---|---|---|
| 4,007,629 | 2/1977 | Hochstein ............................... | 73/53.05 |
| 4,261,838 | 4/1981 | Halleron .................................. | 210/805 |
| 4,265,748 | 5/1981 | Villani et al. ........................... | 210/501 |
| 4,326,953 | 4/1982 | Gibby et al. ............................ | 210/304 |
| 4,435,287 | 3/1984 | Sumimoto . | |
| 4,646,070 | 2/1987 | Yasuhara et al. ...................... | 73/53.07 |
| 5,274,335 | 12/1993 | Wang et al. ............................. | 73/61.43 |
| 5,282,963 | 2/1994 | Hull et la. ............................... | 210/223 |
| 5,316,665 | 5/1994 | Hart ......................................... | 210/85 |
| 5,478,463 | 12/1995 | Brownawell et al. .................. | 210/729 |

Primary Examiner—Richard Chilcot
Assistant Examiner—Eric S. McCall
Attorney, Agent, or Firm—Ronald R. Snider

[57] ABSTRACT

A method for preventing damage to valve faces and valve seat faces and also for preventing partial gas escape, which is mainly caused by solid particles generated by the reaction between incomplete combustion materials produced during engine operation and additive agents included in lubricant oils as well as by adherence of metal dust on the faces by filtering out selected particles.

The solid particles are produced by the reaction of carbon as an incomplete combustion material in an engine with calcium, zinc, phosphorus, magnesium and so on which are included in the additives of the lubricant oils as well as with solid impurities generated by incombustibles included in fuel, and also with metal dust. Particles and impurities bigger than 1 $\mu$m are removed by filter device composed of many piled thin papers, while the same smaller than 1 $\mu$m are retained in the lubricant oil. The valve face and the valve seat face surfaces are maintained clean and smooth.

28 Claims, 7 Drawing Sheets

A ■ Normal engine without equipment
B □ Diesel engine without equipment
C ○ Normal engine with prior equipment
D ● Normal engine with this invention

METHOD FOR MAINTAINING CLEAN SURFACES FOR VALVE SEAT FACES OF INTERNAL COMBUSTION ENGINE

RELATED INVENTIONS

This present disclosure relates to subject matter contained in Japanese Patent Application No. 8-356608 (filed on Dec. 27, 1996) which is expressly incorporated herein by reference in its entirety.

BACKGROUND OF THE INVENTION

This invention relates to a method of maintaining clean surfaces for valve seat faces in internal combustion engines to be used in motor cars and other vehicles.

Up to the present time, an inlet port and an exhaust port are formed on a cylinder head in which a piston reciprocates. These ports open and close in turn by the operation of the relative valves linked with said piston. An inlet valve is seated on the inlet port while an outlet valve is seated on the exhaust port. Valve seat face and valve face which contact each other are highly ground and polished so that good sealing can be obtained thereon.

After burned gases are ejected by the cylinder, in this exhaust gas, incomplete combustion materials exist, which are caused by plural factors such as incombustibles included in the fuel, or carbon, water and other substances generated by combustion. The carbon, acid and other similar substances which result from the incomplete combustion materials react with calcium, zinc, phosphorus, magnesium and other elements included in additive agents of lubricant oils during combustion, and this reaction produces some solid particles. On the other hand, in the lubricant oil, there exist impurities included in the fuel and metal dust on the inner surface of the cylinder, shafts and bearings. When these solid particles, impurities and metal dust are adhered on the valve faces or the valve seat faces, it badly damages the faces and sealing is lost, and this allows gas to escape partially and results in the deterioration of engine compression. This deterioration is a bad influence on combustion efficiency and increases specific fuel consumption thereof, while in case of a motor car the function of engine braking is remarkably lowered.

The additive agents used in the lubricant oils are detrimental when their original role is fulfilled. It is very important to maintain the engine performance to overcome the explained situations, so that it may promote the engine quality and realize the economization of the fuel consumption as well as it maintains the good engine braking through the prevention of the bad influences caused by the adherence of the solid particles and metal dust on the valve faces and the valve seat faces, which are generated and invited by the reaction between the incomplete combustion and the additive agents included in the lubricant oils.

In the past, the deterioration of the engine compression which brings worse fuel consumption and inferior engine braking was generally believed to be dependent upon hysteresis of a liner fatigue or a ring fatigue.

According to the knowledge of this inventor, however, the source of this deterioration is mainly due to the solid particle and metal dust adhered on the valve faces or the valve seat faces, not by the hysteresis.

SUMMARY OF THE INVENTION

The invention has an object to provide a method to maintain clean surfaces for valve faces or valve seat faces, wherein adherence of some solid particles and metal dust on valve faces or valve seat faces is prevented. Otherwise this piled up adherence causes damage on the faces and causes partial gas escape thereof.

This invention has another object to provide a method, wherein lubricant oil is kept pure for a long time without required exchanging whereby it provides the benefit of protecting natural and material resources.

The present invention has another object to provide a method of decreasing consumption of lubricant oil, which prevents used lubricant from being illegally abandoned to the ground and it prevents earth contamination.

The invention has a further object for provision of a method, wherein combustion efficiency of the engine is greatly improved and approaches complete burning without emitting incombustible impurities in the air. Air contamination is decreased to benefit human environmental sanitation.

In order to attain said objects, the inventor has adopted a device as a filter comprising a plurality of piled up thin papers, wherein the lubricant oil flows through the filter in parallel with gaps between each paper. First, among the solid particle impurities which are caused by the reaction between the carbon or acid substances generated by incomplete combustion in the engine and calcium, zinc, phosphorus, magnesium and other similar substances included in the additive of the lubricant oil; secondly among incombustibles included in the fuel; and thirdly among the solid impurities generated by metal dust, impurities bigger than 1 $\mu$m are caught and retained by the paper fiber equipped with the filter device during the flow in accordance with the theory of Brownian movement, while the impurities smaller than 1 $\mu$m still purposely remain in the lubricant oil, so that the valve face and the valve seat face can be kept clean constantly.

DETAILED DESCRIPTION OF THE PREFERRED EMBODIMENT

Figure 1:
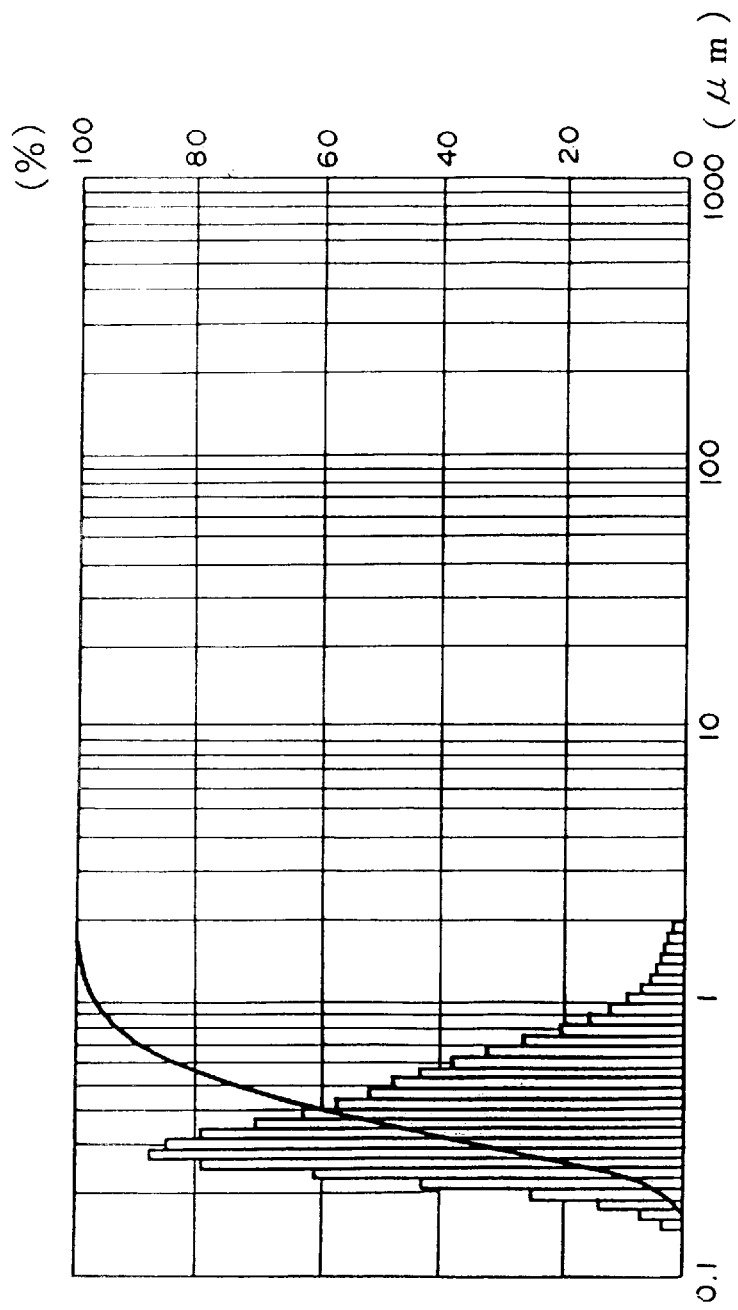
FIG. 1 is a graphical representation and shows an analyzed value for particle size in a lubricant oil after a car has run for 2,000 kilo meters after adoption of the invention.

The preferred embodiment of the present invention is now explained.

Solid particles of impurities are generated by the reaction between carbon or acid substances which are incomplete combustion materials and calcium, zinc, phosphorus, magnesium or other similar substances which are included in additive agents of lubricant oil, while solid impurities are also generated by incombustibles included in fuel and metal dust. This invention is characterized in that said impurities bigger in size than 1 $\mu$m are effectively removed while those smaller than 1 $\mu$m remain on purpose, so that valve faces and valve seat faces can be constantly cleaned. When petroleum fuel is burned in engine, carbonic acid gas, water, acid and incomplete combustion materials are generated. The carbonic gas and water are ejected out as exhausted gas, but some parts of the incomplete combustion materials remain in the cylinder and are mixed into the lubricant oil. The carbon when mixed into the lubricant oil makes a chemical reaction with calcium, zinc, phosphorus, magnesium and other similar substances included in the additives of the lubricant oil. These become solid particles after burning.

If the substance which passes over the valve face or the valve seat face is in a vapor or liquid condition, the faces can be kept clean, but when solid particles generated by carbonic reaction or other solid impurities generated by incombustibles or metal dust pass over said faces, they pile up thereon or enter into the faces, and as a result the sealing on the contacting faces is damaged. When they adhere on the valve faces or the valve seat faces, it damages the faces and causes partial gas escape. Thus, both the loss of the sealing and the gas escape cause lower engine compression and deteriorate combustion causing inferior fuel consumption as well as causing inferior engine braking. In the past, the loss of sealing and gas escape were believed to be caused by hysteresis of the engine, and it was regarded to be quite difficult to improve. However, after long study and through actual experiments, the present inventor has found that the loss of the sealing and occurrence of gas escape are mainly due to the undesirable particles existing in the lubricant oil and that these defects can be prevented by the method of treating properly with the particles in the lubricant oil.

When the solid impurities bigger than 1 $\mu$m in size are removed from the lubricant oil and those smaller than 1 $\mu$m are purposely retained, a clean surface is maintained and partial gas escape is prevented, because the impurities smaller than 1 $\mu$m enhance clean surfaces to produce smooth faces. According to the present technology it is very difficult to provide valve faces or valve seat faces at maintained accurate evenness smaller than 1 $\mu$m. Therefore, in case where impurities exceeding 1 $\mu$m are removed, the smooth surface can be obtained. The impurities smaller than 1 $\mu$m are actually smaller than the provided and uneven surface, and therefore they become clogged into the minute dents caused by said unevenness. This clogging is found to rather enhance the smooth surface. Even if a tiny scratch exists on the surface, such impurities smaller than 1 $\mu$m cover the scratched face to eliminate the scratch and to reproduce the smooth surface by the clogging.

As a means to remove the impurities in the lubricant oil, a filter element composed of a plurality of piled thin papers like a tissue paper is preferably adopted. According to the actual experiments performed by the inventor, it is referred that 2,500~3,000 sheets to be used for a small sized truck car and 800~1,500 sheets to be used for a normal motor car equipped with about 2,000 c.c. displacement engine are adopted. When the lubricant oil flows into the filter element, the impurities are caught by paper fiber during its flow and they are separated and removed from the lubricant oil by Brownian movement. Through this filtering effect, the impurities bigger than 1 $\mu$m are effectually removed, while those smaller than 1 $\mu$m remain in the oil. The remnant impurities produce the smooth surface as explained above. The filtering area is now in effect both front and back side of each paper, and therefore the total effective area is now counted as the number of the paper sheets multiplied 2 sides. Thus, this filter element has a high filtering performance. In order to confirm this filtering performance, diesel engine lubricant oil was tested for 3,000 hours and after this testing, the element was completely burned out, whereon the weight of the ash obtained thereof was 210 grams. The same element was also burned out before its use, and had an ash weight of 20 grams. These results proved that total 190 grams solid impurities were trapped and separated with this filtering experiment.

Figure 2:
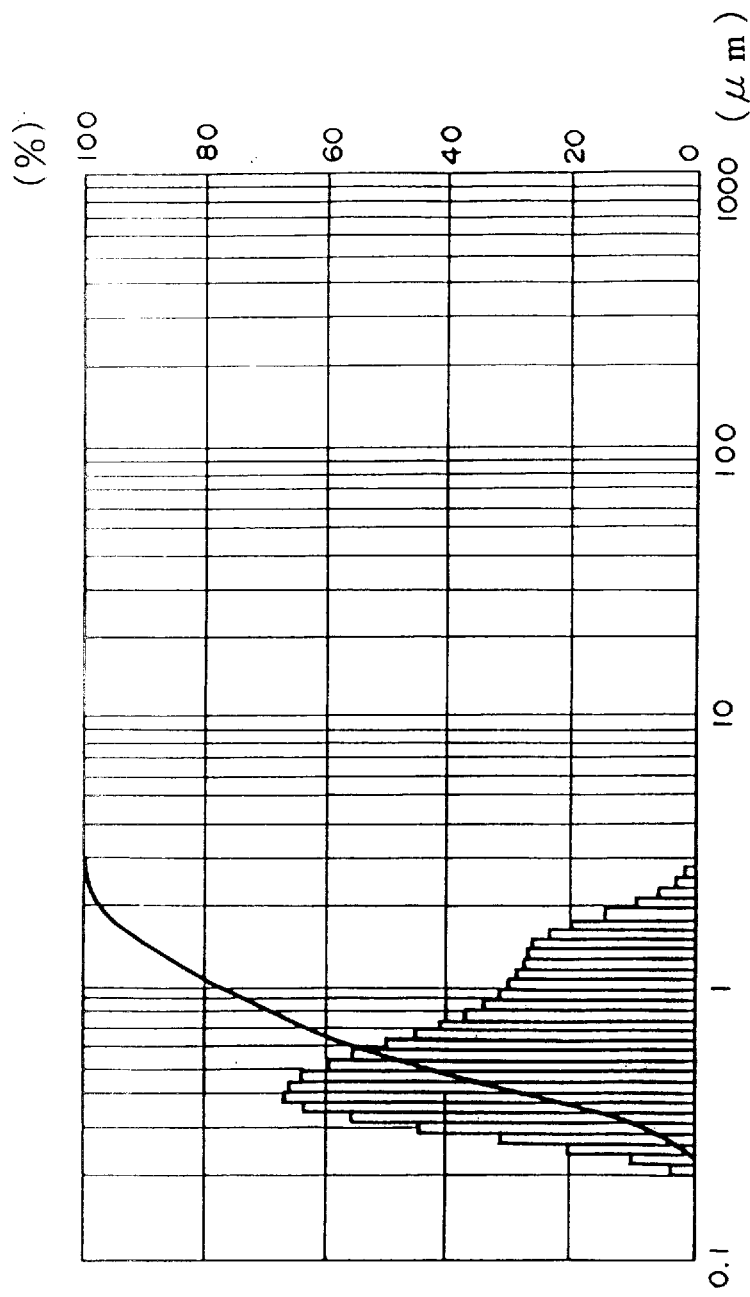
FIG. 2 is also a graphical representation and shows an analyzed value for particle size in a lubricant oil in the condition after a car has run 5,000 kilo meters after adoption of the invention.
Figure 3:
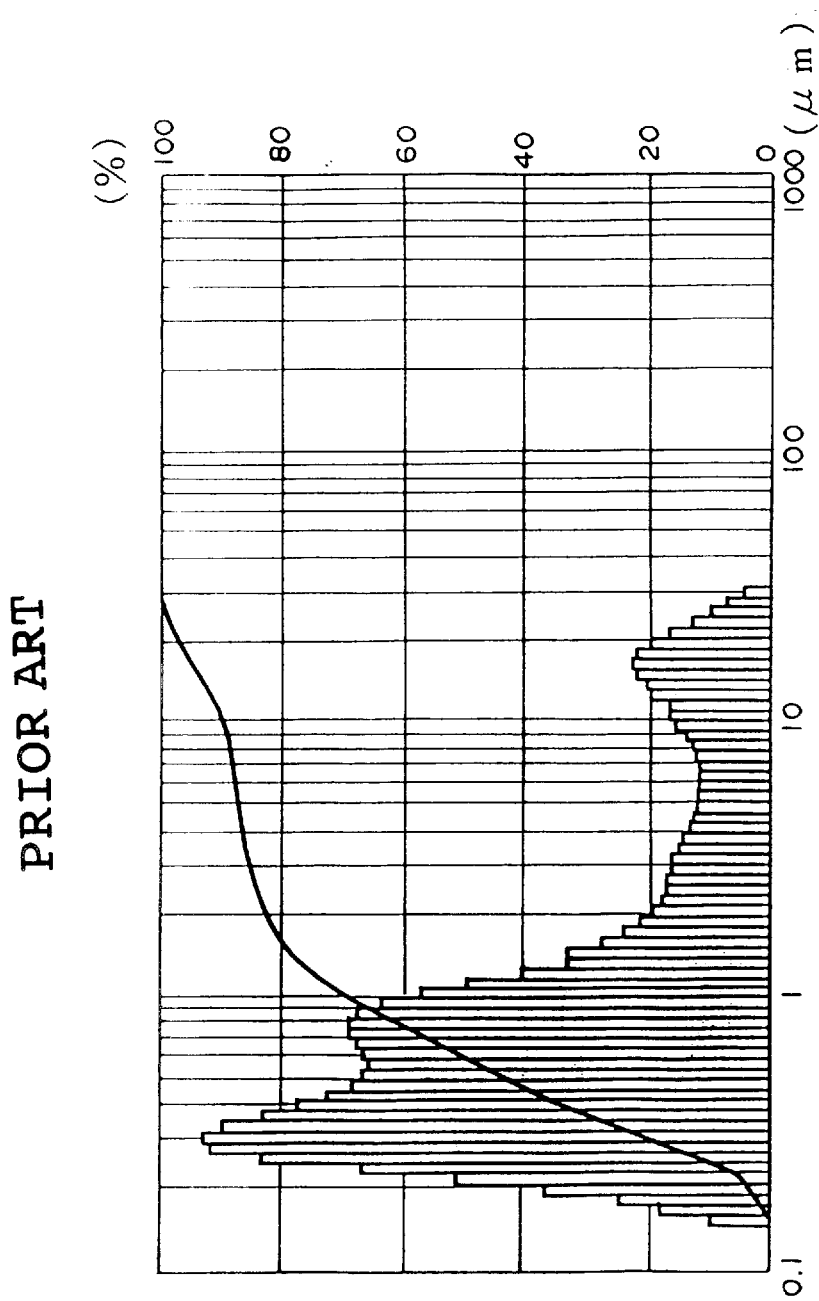
FIG. 3 is a graphical representation showing an analyzed value for particle size of lubricant oil performed by a prior art filter.
Figure 4:
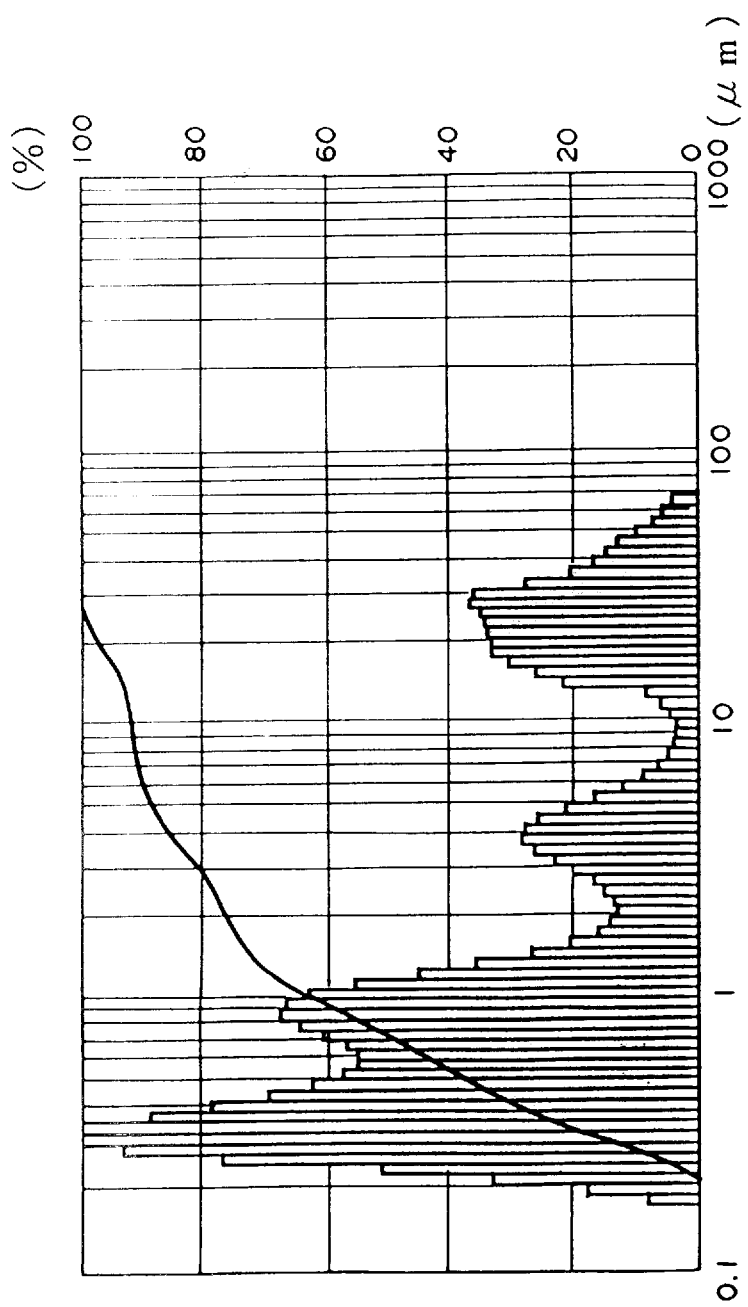
FIG. 4 is a graphical representation showing an analyzed value for particle size of mixed lubricant oil exhausted by plural vehicles.

The remnant impurities existing in the lubricant oil were analyzed to determine their particle sizes, and these analyzed data are shown in FIGS. 1, 2, 3 and 4. Micro track is used for this analyzation to obtain these data. FIG. 1 and FIG. 2 are the values of the particle sizes obtained by the present invention, and FIG. 3 is a value obtained by prior art filter, while FIG. 4 is a value obtained from mixed lubricant oils exhausted by plural vehicles.

FIG. 1 is the lubricant oil after 2,000 kilo meters running, while FIG. 2 is after 5,000 kilo meters running. With reference to FIG. 1, a bar chart shown in the figure clearly indicates that the particles of the impurities smaller than 1 $\mu$m are of a high percentage, while the particles bigger than 1 $\mu$m are a very small percentage. FIG. 2 also indicates the particles smaller than 1 $\mu$m are of a high percentage, although the particles bigger than 1 $\mu$m are slightly increased compared with FIG. 1. A first example of Applicant's method of maintaining clean surfaces for valve faces and valve seat faces in an internal combustion engine by allowing particles smaller than 1 $\mu$m to remain in lubricant oil comprises the steps of constructing a filter device composed of a plurality of piled thin papers; supplying lubricant oil to said filter device; running said oil through said filter device in parallel with gaps between each of said paper layers; wherein solid particles larger in size than 1 $\mu$m are retained by said filter by capture of said particles through Brownian movement; allowing particles which are smaller than 1 $\mu$m to be retained in the oil; and wherein particle sizes greater than 2 $\mu$m comprise less than 5% of the total number of particles passed after engine operation for 5,000 kilometers. A second example of Applicant's method of maintaining clean surfaces for valve faces and valve seat faces in an internal combustion engine by allowing particles smaller than 1 $\mu$m to remain in lubricant oil comprises the steps of constructing a filter device composed of a plurality of piled thin papers; supplying lubricant oil to said filter device; running said oil through said filter device in parallel with gaps between each of said paper layers; wherein solid particles larger in size than 1 $\mu$m are retained by said filter by capture of said particles through Brownian movement; allowing particles which are smaller than 1 $\mu$m to be retained in the oil and wherein particle sizes greater than 2 $\mu$m comprise less than 2% of the total number of particles passed after engine operation for 2,000 kilometers.

On the contrary, in reference to FIG. 3 and FIG. 4, a large quantity of the impurities bigger than 1 $\mu$m, sometimes even bigger than 10 $\mu$m, are seen. The impurities bigger than 10 $\mu$m frequently damage the valve faces or the valve seat faces, and when they are piled up, gas escape occurs.

Figure 5:
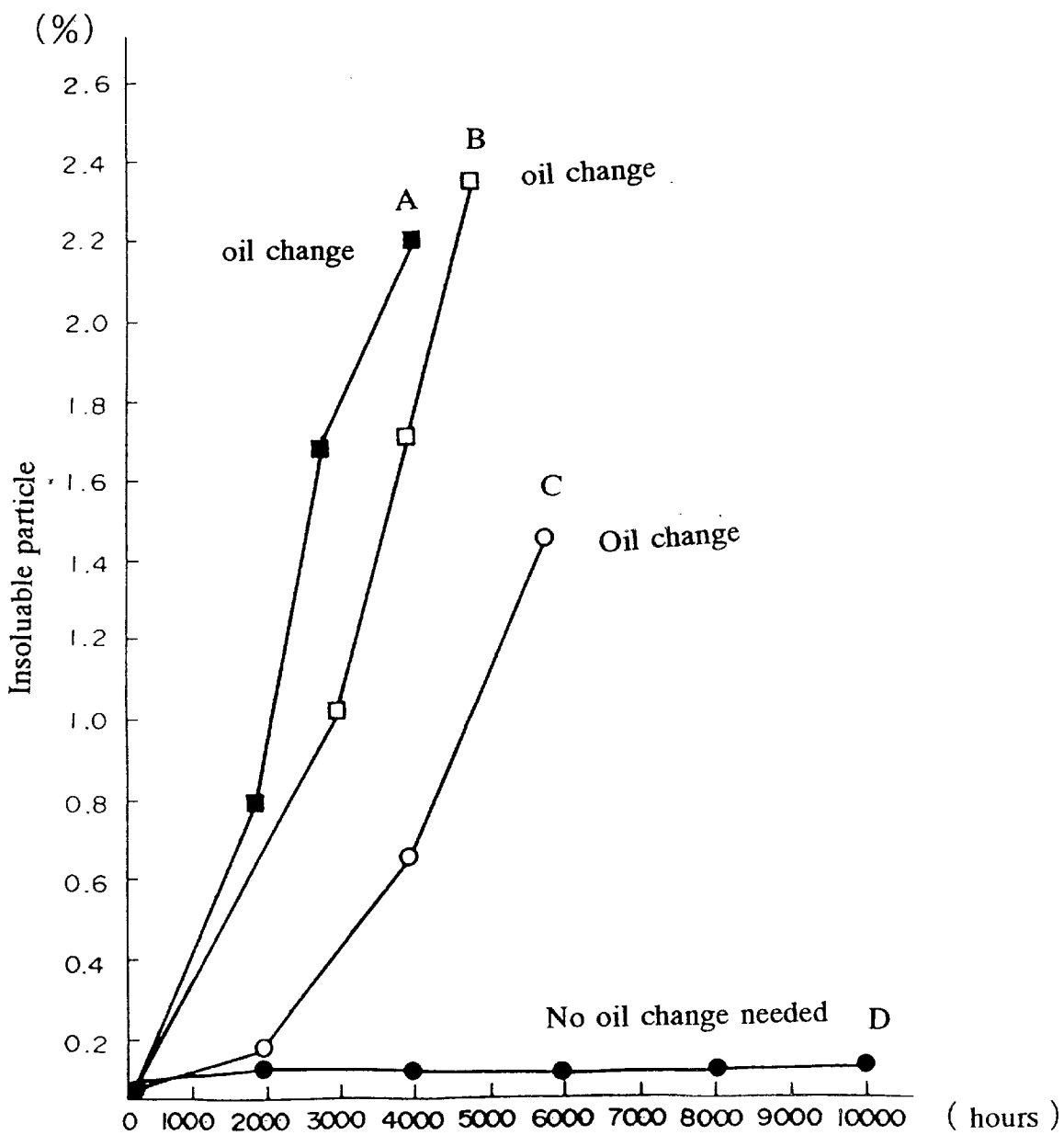
FIG. 5 is a graphical representation showing the connection of driving time and insoluble particles in a lubricant oil passing through a filter developed by this invention, that passing through a prior art filter, and that passing through without use of any filter.

Referring to FIG. 5, a graph is presented to show a relationship between driving time and the quantity of the insoluble particles for four cases. A mark "A" is a car equipped with normal engine but without any filter equipment. A mark "B" is another car equipped with diesel engine without the filter equipment. A mark "C" is another car equipped with prior filter element, while a mark "D" is a another car equipped with the device developed by the present invention. In view of this graph, it is quite clear that the lubricant oil passing through the prior art filter and the same passing with no filter show a remarkable increase of the insoluble particles, and therefore the exchange of the lubricant oil is required after 3,000~5,000 hours. On the other hand, the lubricant oil treated by the present invention shows almost no increase of the insoluble particles in its lapse of time, and therefore it is not necessary to exchange the oil even after the 10,000 hours lapse.

According to the statistics announced by Californian authorities in 1988, annual consumption of the lubricant oil all over U.S.A. is quoted at eight million tons, and it is now deemed 57% of the used oil has been abandoned. However, it is now feared that one-fourth of the used quantity might have been illegally abandoned. Once the used oil is formally and legally collected by the treatment factories, it is treated into a harmless material while some are treated for re-use. The main problem is the illegal abandonment. Without doubt, this illegal abandonment of the used oil contaminates the good earth. On the other hand, the incombustible impurities, for instance, soots, included in exhaust gas emitted from the internal combustion engines, especially increased by the inferior valve seating, causes increased pollution in the air. Therefore, this present invention provides a fruitful method to decrease the use of the lubricant oil as well as to promote combustion efficiency in engines, so that it will contribute to the conservation of the material resources and the benefit for maintaining a good earth environment.

Figure 6:
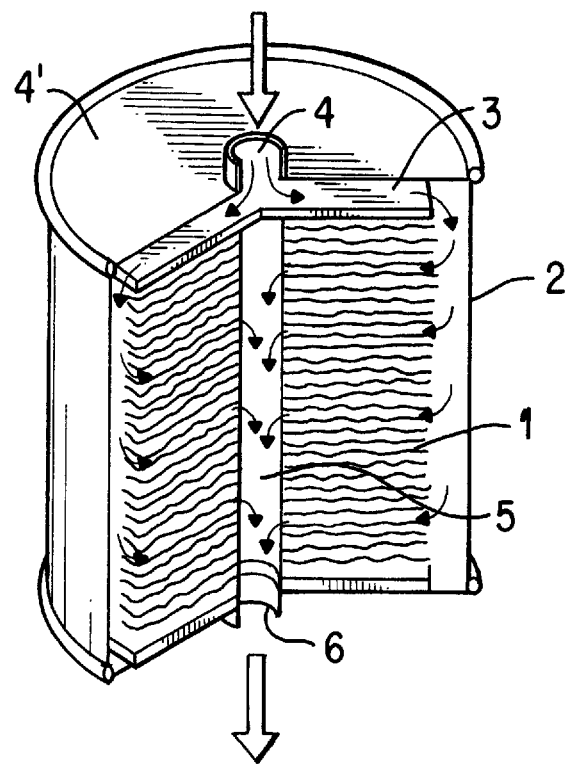
FIG. 6 is a schematic illustration showing the structure of the filter developed by this invention.

FIG. 6 is a schematic view showing the structure of the filter element developed by this invention. On the upper part of an element (1) a pressure plate (4') is positioned, and a plurality of piled thin papers are stored in a cartridge container (2). An entrance (4) is formed on the middle and upper portion of the container (2) for soiled lubricant oil. The lubricant oil comes into the entrance (4) and presses the pressure plate (3), and then the oil flows on the sides. During its flow, among the gaps in the filter layer of the element (1) the oil runs into a central channel (5) and flows out of a outlet (6) established in the lower surface of the cartridge container (2).

Figure 7:
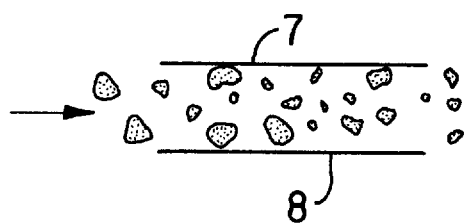
FIG. 7 is a flow chart showing the function of the filter developed by this invention.

In reference to FIG. 7, the impurities (7) stick over the paper (8) and are caught thereby for removal.

Figure 8:
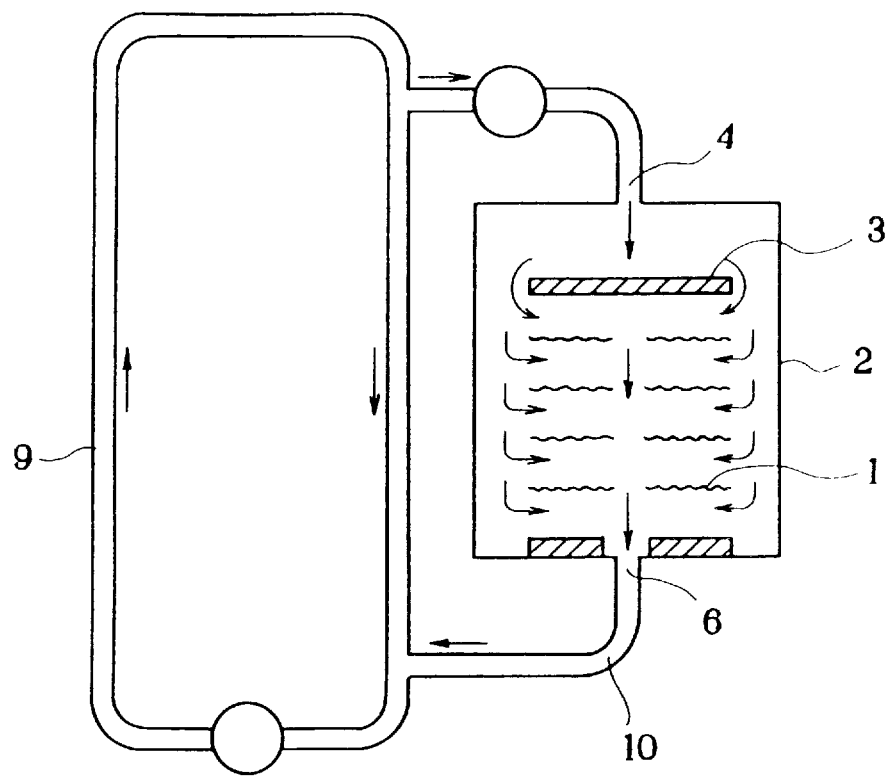
FIG. 8 is a schematic illustration showing the filter channel of the lubricant oil.

FIG. 8 is a schematic view showing a circular route for engine lubricant oil. A filter channel (10) is diverged from a normal channel (9) for the oil. A filter device of the cartridge container (2) is connected with the filter channel (10). One part of the lubricant oil running through the normal channel (9) comes into the filter channel (10) through the entrance (4) and runs through the container (2) via the filter element (1). The clean oil which is filtered flows out of the outlet (6) and enters the filter channel, and finally the clean oil returns to the normal channel (9) for recirculation.

As explained so far, this invention provides a method to remove impurities bigger than 1 μm from lubricant oils. These impurities cause damages on the valve faces or the valve seat faces and also cause gas escape. At the same time, impurities smaller than 1 μm are retained in the oil on purpose, to produce the smooth surface on the contacting faces between the valve and the valve seat. By this invention, the deterioration of engine compression is prevented, and combustion efficiency in the engine is enhanced and maintained, while the good engine braking is maintained.

It is further understood by those skilled in the art that the foregoing description is a preferred embodiment of the disclosed device and that various changes and modifications may be made in the invention without departing from the spirit and scope thereof.

What is claimed is:

1. A method of maintaining clean surfaces for valve faces and valve seat faces in an internal combustion engine by allowing particles smaller than 1 μm to remain in lubricant oil comprising the steps of:

constructing a filter device composed of a plurality of piled thin papers;

supplying lubricant oil to said filter device;

running said oil through said filter device in parallel with gaps between each of said paper layers;

wherein solid particles larger in size than 1 μm are retained by said filter by capture of said particles through Brownian movement;

allowing particles which are smaller than 1 μm to be retained in the oil; and wherein particle sizes greater than 2 μm comprise less than 5% of the total number of particles passed after engine operation for 5,000 kilometers.

2. A method according to claim 1 wherein deterioration of engine compression is prevented, and combustion efficiency of the engine is maintained, while good engine braking is maintained.

3. The method in accordance with claim 1 wherein said particles are generated by a reaction between carbon produced as an incomplete combustion material from the engine and are larger and smaller than 1 μm.

4. The method in accordance with claim 1 wherein the oil contains calcium, zinc, phosphorus, and magnesium.

5. The method in accordance with claim 4 wherein said calcium, zinc, phosphorous, and magnesium are contained in said oil as additive agents.

6. The method in accordance with claim 1 wherein particles also comprise incombustibles of fuel and metal dust.

7. A method in accordance with claim 1 wherein deterioration of engine compression is prevented and combustion efficiency of the engine is enhanced while good engine braking is maintained.

8. A method of maintaining clean surfaces for valve faces and valve seat faces in an internal combustion engine by allowing particles smaller than 1 μm to remain in lubricant oil comprising the steps of:

constructing a filter device composed of a plurality of piled thin papers;

supplying lubricant oil to said filter device;

running said oil through said filter device in parallel with gaps between each of said parer layers;

wherein solid particles larger in size than 1 μm are retained by said filter by capture of said particles through Brownian movement;

allowing particles which are smaller than 1 μm to be retained in the oil; and wherein particle sizes greater than 2 μm comprise less than 2% of the total number of particles passed after engine operation for 2,000 kilometers.

9. A method according to claim 8 wherein deterioration of engine compression is prevented, and combustion efficiency of the engine is maintained, while good engine braking is maintained.

10. The method in accordance with claim 8 wherein said particles are generated by a reaction between carbon produced as an incomplete combustion material from the engine and are larger and smaller than 1 μm.

11. The method in accordance with claim 8 wherein the oil contains calcium, zinc, phosphorus, and magnesium.

12. The method in accordance with claim 11 wherein said calcium, zinc, phosphorous, and magnesium are contained in said oil as additive agents.

13. The method in accordance with claim 11 wherein said substances are contained in said oil as additive agents.

14. A method in accordance with claim 8 wherein deterioration of engine compression is prevented and combustion efficiency of the engine is enhanced while good engine braking is maintained.

15. A method of maintaining clean surfaces for valve faces and valve seat faces in an internal combustion engine by allowing particles smaller than 1 μm to remain in lubricant oil comprising the steps of:

constructing a filter device composed of a plurality of piled thin papers;

supplying lubricant oil to said filter device;

running said oil through said filter device in parallel with gaps between each of said paper layers;

wherein solid particles larder in size than 1 μm are retained by said filter by capture of said particles through Brownian movement;

allowing particles which are smaller than 1 μm to be retained in the oil; and wherein particle sizes greater than 8 μm comprise less than 1% of the total number of particles passed after engine operation for 2,000 kilometers.

16. A method according to claim 15 wherein deterioration of engine compression is prevented, and combustion efficiency of the engine is maintained, while good engine braking is maintained.

17. The method in accordance with claim 15 wherein said particles are generated by a reaction between carbon produced as an incomplete combustion material from the engine and are larger and smaller than 1 μm.

18. The method in accordance with claim 15 wherein the oil contains calcium, zinc, phosphorus, and magnesium.

19. The method in accordance with claim 18 wherein said calcium, zinc, phosphorous, and magnesium are contained in said oil as additive agents.

20. The method in accordance with claim 18 wherein said substances are contained in said oil as additive agents.

21. A method in accordance with claim 15 wherein deterioration of engine compression is prevented and combustion efficiency of the engine is enhanced while good engine braking is maintained.

22. A method of maintaining clean surfaces for valve faces and valve seat faces in an internal combustion engine by allowing particles smaller than 1 μm to remain in lubricant oil comprising the steps of:

constructing a filter device composed of a plurality of piled thin papers;

supplying lubricant oil to said filter device;

running said oil through said filter device in parallel with gaps between each of said parer layers;

wherein solid particles larder in size than 1 μm are retained by said filter by capture of said particles through Brownian movement;

allowing particles which are smaller than 1 μm to be retained in the oil; and wherein particle sizes greater than 8 μm comprise less than 1% of the total number of particles passed after engine operation for 5,000 kilometers.

23. A method according to claim 22 wherein deterioration of engine compression is prevented, and combustion efficiency of the engine is maintained, while good engine braking is maintained.

24. The method in accordance with claim 22 wherein said particles are generated by a reaction between carbon produced as an incomplete combustion material from the engine and are larger and smaller than 1 μm.

25. The method in accordance with claim 22 wherein the oil contains calcium, zinc, phosphorus, and magnesium.

26. The method in accordance with claim 25 wherein said calcium, zinc, phosphorous, and magnesium are contained in said oil as additive agents.

27. The method in accordance with claim 25 wherein said substances are contained in said oil as additive agents.

28. A method in accordance with claim 22 wherein deterioration of engine compression is prevented and combustion efficiency of the engine is enhanced while good engine braking is maintained.

* * * * *